United States Patent [19]

Eifling

[11] Patent Number: 4,696,751

[45] Date of Patent: Sep. 29, 1987

[54] VIBRATORY SCREENING APPARATUS AND METHOD FOR REMOVING SUSPENDED SOLIDS FROM LIQUID

[75] Inventor: Dennis R. Eifling, Katy, Tex.

[73] Assignee: Dresser Industries, Inc., Dallas, Tex.

[21] Appl. No.: 892,644

[22] Filed: Aug. 4, 1986

[51] Int. Cl.$^4$ .................... B01D 39/10; B07B 1/40
[52] U.S. Cl. ............................ 210/780; 210/495; 210/499; 209/319; 209/402; 209/403; 55/484
[58] Field of Search ............... 210/384, 388, 495, 499, 210/280; 209/319, 275, 401, 402, 403; 245/8; 139/425 R; 55/484; 162/348, 351, DIG. 1

[56] References Cited

U.S. PATENT DOCUMENTS

| | | | |
|---|---|---|---|
| 1,423,021 | 7/1922 | Reynolds | 209/403 |
| 3,716,138 | 2/1973 | Lumsden | 209/401 |
| 3,905,788 | 9/1975 | Alliger | 55/489 |
| 4,033,865 | 7/1977 | Derrick, Jr. | 209/402 |
| 4,237,000 | 12/1980 | Read et al. | 209/319 |

FOREIGN PATENT DOCUMENTS 3333140  4/1985  Fed. Rep. of Germany ...... 210/499

*Primary Examiner*—Richard V. Fisher
*Assistant Examiner*—Richard D. Jordan

[57] ABSTRACT

A vibratory screening apparatus for removing suspended solids from liquid comprising a first mesh screen having openings with first and second dimensions for receiving the suspended solids thereon, a second mesh screen in superimposed abutment with the first screen and having openings with a third and fourth dimension perpendicular to the first screen openings, the third dimensions being larger than the first dimension and the fourth dimension being smaller than the second dimension of the first screen openings, and a vibratory source coupled to the abutting screens for vibrating the screens whereby the openings of the second screen effectively prevent suspended solids from becoming lodged in the openings of the first screen.

14 Claims, 4 Drawing Figures

VIBRATORY SCREENING APPARATUS AND METHOD FOR REMOVING SUSPENDED SOLIDS FROM LIQUID

BACKGROUND OF THE INVENTION

The present invention relates to a vibratory screening apparatus which improves the removal of solids from liquid and reduces screen plugging. A pair of screens is held in superimposed abutting relationship. The first screen has rectangular openings of first and second dimensions. The second screen has rectangular openings of third and fourth dimensions perpendicular to the first screen openings with the third dimension being larger than the first dimension of the first screen; and the fourth dimension being smaller than the second dimension of the first screen. Solids that will tend to plug the first screen opening will be rejected by the second screen wires positioned below. A third screen of coarser mesh may be placed beneath the first and second screens to underlie and support them. The screens are coupled to a vibratory source.

It is necessary in many applications to separate solids or finely divided materials from a liquid composition. Industrial screening equipment exists for this purpose. A major concern in this art, however, is the tendencey of the screening equipment to become clogged or plugged when separating finely divided solids from liquids. This clogging of the screens greatly impairs the effectiveness of industrial screening equipment, and in some cases the effectiveness of such equipment may be essentially reduced to zero. Various methods have been proposed to remove solid particles wedged into industrial screening equipment such as the use of square openings in both screens with the bottom screen; however, plugging of the screen still occurs.

Other applications in the art set forth a vibratory screening apparatus comprising a plurality of screens in immediate vertical juxtaposition with the mesh size of the screen cloths varying from screen to screen and the screens are enframed and coupled to a vibratory source. Clogging or plugging is still a problem in this case, however.

Rectangular mesh screens are less susceptible to plugging than square; however, larger particles can pass through a rectangular screen than a comparable square mesh. It has been discovered that by using a square mesh screen under the rectangular screen, the square openings being larger than the smaller dimension of the rectangular opening and smaller than the larger dimension, solids that would tend to plug the rectangular opening would be rejected by the square mesh wires below. The rejection of larger particles by the wire below would also improve the separation capabilities of the rectangular mesh making its particle rejection cut point comparable to an equivalent square mesh.

The instant invention comprises a vibratory screening apparatus which utilizes a pair of screens of specific mesh dimensions held in superimposed abutting relationship. The first screen openings have first and second rectangular dimensions, and the second screen openings have third and fourth rectangular dimensions which are perpendicular to the first screen openings. The third dimension of said second screen opening is parallel to and larger than the first dimension of the first screen opening, and the fourth dimension of the second screen opening is parallel to and smaller than the second dimension of the first screen opening. The screens are then coupled to a vibratory source for vibrating the screens. This design improves the removal of finely divided solids and particulate matter from liquids, by reducing plugging and clogging of the screens.

SUMMARY OF THE INVENTION

Thus, the present invention relates to a vibratory screening apparatus for removing suspended solids from a liquid comprising a first mesh screen having openings with first and second dimensions for receiving suspended solids thereon, a second mesh screen in superimposed abutment with the first screen and having openings with a third and fourth dimension, the third dimension being parallel to a larger than first dimension of the first screen opening and the fourth dimension being parallel to and smaller than the second dimension of the first screen opening, and a vibratory source coupled to the abutting screens for vibrating the screens whereby the openings of the second screens effectively prevent suspended solids from becoming lodged in the openings of the first screen.

The present invention also relates to a method of removing suspended solids from a liquid comprising the steps of forming a first mesh screen having openings with first and second dimensions for receiving the suspended solids thereon, placing a second mesh screen in superimposed abutment with the first screen, the second screen having openings with third and fourth dimensions perpendicular to the first screen openings and with the third dimension larger than the first dimension and the fourth dimension smaller than the second dimension of the first screen openings, vibrating said screens with the vibratory source coupled to the abutting screens and passing a liquid with suspended solids through the vibrating screens whereby the openings of the second screen effectively prevent said suspended solids from becoming lodged in the openings of the first screen.

BRIEF DESCRIPTION OF THE DRAWINGS

These and other objects of the present invention will be more clearly disclosed in connection with the accompanying drawings in which.

DETAILED DESCRIPTION OF THE DRAWINGS

Figures 1, 2:
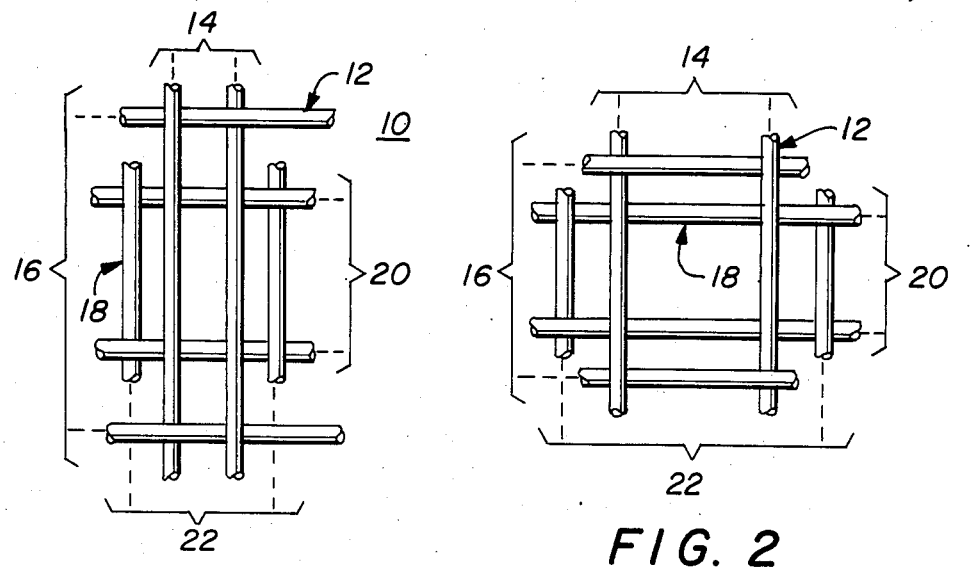
FIG. 1 is a schematic representation of a top view of the novel vibratory screening apparatus with one screen having square openings and the other screen having rectangular openings.
FIG. 2 is a schematic representation of a top view of the novel vibratory screening apparatus with both screens having rectangular openings.

The novel vibratory screening apparatus of the present invention is designated by the numeral 10 as shown in FIG. 1. It comprises a first mesh screen 12 with rectangular dimensions of width 14 and length 16. A second screen 18 is held in superimposed abutting relationship to the first screen 12. The second screen 18 has dimensions 20 and 22. Dimensions 16 of the first screen is larger than dimension 20 of the second screen, and dimension 14 of the first screen is smaller than dimension 22 of the second screen. Dimensions 20 and 22 may also be equal forming a square opening in the second screen 18 as shown. Dimensions 20 and 22 may also be unequal as shown in FIG. 2 as long as dimension 20 is smaller than dimension 16 and dimension 22 is larger than dimension 14 of said first screen. A third coarser mesh screen 24 (FIG. 3) may underlie and support the screens of FIG. 1 and FIG. 2.

Thus, a rectangular mesh screen 12 is used as the top screen which is relatively resistant to plugging and a square mesh 18 is used under it in abutting relationship. The square mesh helps to exclude the particles that may tend to plug the rectangular mesh. The square mesh is sized such that any particle that passes through the rectangular opening also passes through the square opening without plugging. The screens are sized for separation at the $D_{50}$ cut point. This means that with 175 micron separation size, 50% of the 175 micron size particles will pass through the screen and 50% of them will be retained on the screen. All of the separation sizes referred to hereafter are $D_{50}$. Data on particle separation determined in a laboratory test is reported in "Screen Selection is Key to Shale-shaker Operations". *Oil & Gas Journal*, Dec. 7, 1981, pp. 131–141, by L. L. Hoberock. Examples of the combinations of screens are set forth as follows:

EXAMPLE I

80×40 mesh (Market Grade) top screen having a particle separation size of 175 microns.

50×50 mesh (Market Grade) bottom screen having a particle separation size of 230 microns.

The particle separating capability of the 80×40 mesh is improved by the intersecting of its openings by the 50×50 mesh. Every 40 mesh opening would have at least one wire of the 50×50 mesh intersecting with and perpendicular to it.

Tests have not been run; however, the intersection of the wires leaves smaller openings and estimates of separation can be made from existing data in the article cited. The new combination gives a very comparable particle separation when compared with an 80×80 mesh (Market Grade) with a particle separation size of 160 microns. In addition the flow capacity would be increased approximately 50% more than the 80×80 mesh. The non-plugging capabilities insure a continuous high flow whereas the 80×80 square mesh becomes increasingly plugged with ever decreasing flow capacity.

Thus, a stated previously, any particle of a near spherical shape that will pass through the 80×40 mesh will also pass through the 50×50 mesh with no plugging.

EXAMPLE II

Top Screen Tensile Bolting Cloth material 120×60 mesh.

Bottom Screen Tensile Bolting cloth 80×80 mesh.

For the combination in Example II, the particle separation is finer than the 120×60 mesh. This combination gives a particle separation equivalent to an 80×80 mesh (Market Grade) with more than twice the flow capacity.

Also a screen with rectangular openings may be used as the bottom screen.

EXAMPLE III

Top Screen of rectangular 80×40 mesh having a particle separation size of 175 microns Bottom Screen of rectangular 80×40 mesh having a particular separation size of 175 microns.

However, the bottom screen rectangular dimensions must be perpendicular to the corresponding sides of the rectangular dimensions of the openings of the upper screen. That is, the long side of the upper opening must be perpendicular to the long side of the lower opening.

Figure 3:
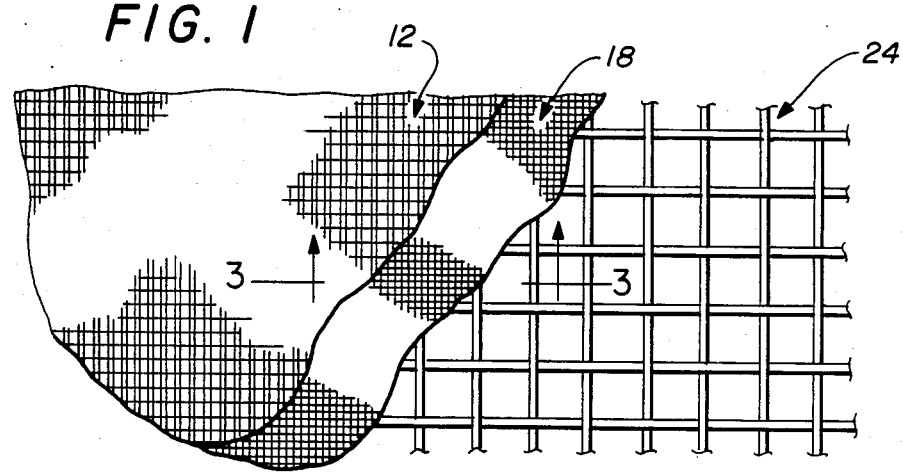
FIG. 3 is a fragmentary top plan view of a portion of the screen constructed according to the form of the present invention.

FIG. 3 is enlarged fragmentary top plan view of the screens constructed according to one form of the present invention. The first screen 12, having rectangular openings with dimensions including length 16 and width 14, is placed in superimposed abutting relationship with the second screen 18 having dimensions including width 20 and length 22 as shown in FIG. 1 or FIG. 2. A third mesh screen 3 underlies and supports screens 1 and 2 which are held in superimposed abutting relationship. This backing screen is a conventional expedient for supporting the relatively fine screens 12 and 18 and has openings a number of times larger than the screen element openings and it performs no screening function but serves entirely as a support for screens 12 and 18.

Figure 4:
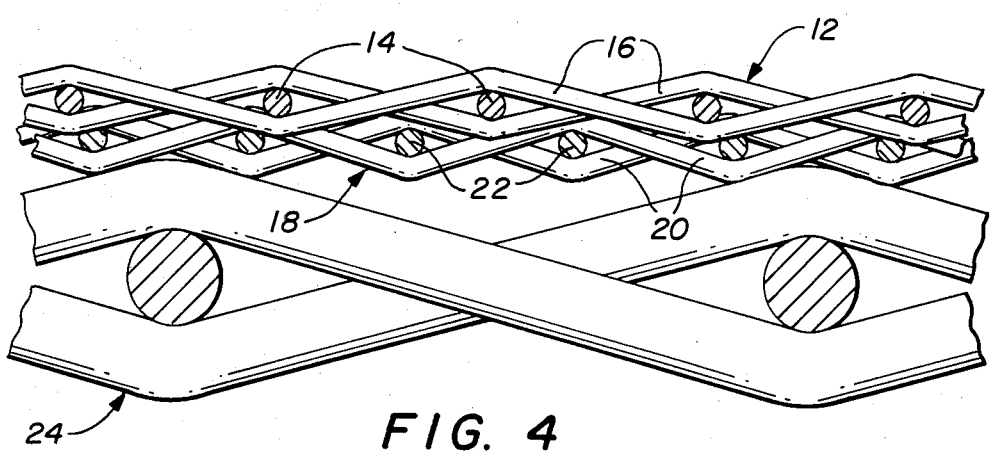
FIG. 4 is a transverse general cross-sectional view of at least a portion of the screen structure of FIGS. 1 and 2.

FIG. 4 comprises a transverse cross-sectional view through the side of the screen structure illustrated in FIG. 3 on a generally vertical plane. The first screen 12 is placed in superimposed abutting relationship to the second screen 18.

Thus, there has been disclosed a novel vibratory screening apparatus for removing suspended solids from a liquid comprising a pair of screens held in superimposed abutting relationship. The first screen has rectangular openings of first and second dimensions. The second screen has rectangular openings of third and fourth dimensions. The second screen is held in superimposed abutting relationship with the first screen. The second screen openings are perpendicular to the first screen openings with the third dimension of the second screen larger than the first dimension and the fourth dimension of the second screen is smaller than the second dimension of the first screen openings. A vibratory source is coupled to the abutting screens for vibrating the screens and the openings of the second screen therefore effectively prevents suspended solids from becoming lodged in the openings of the first screen.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A vibratory screening apparatus to effectively prevent suspended solids from becoming lodged therein during removal of suspended solids from a liquid comprising:
   a. a first upper mesh screen having openings with first and second different dimensions for receiving said suspended solids thereon,
   b. a second lower mesh screen in superimposed abutting relationship with said first screen and having openings with a third and fourth dimension perpendicular to the dimensions of said first screen openings, said third dimension being larger than the smaller of said dimensions of said first mesh screen openings and said fourth dimension being smaller than the larger of said dimensions of said first mesh screen openings, and c. vibratory means coupled to said abutting screens for vibrating said screens whereby said abutting screens effectively prevent suspended solids from becoming lodged in said upper and lower mesh screen openings.

2. A vibratory screening apparatus for removing suspended solids from liquid as in claim 1 wherein:

a. said first upper mesh screen has rectangular openings for receiving said suspended solids thereon, and b. said second lower mesh screen in superimposed abutment with said first mesh screen has rectangular openings with said third and fourth dimensions of different length.

3. The screening apparatus of claim 1 wherein said second screen openings are of square shape.

4. The screening apparatus of claim 2 or 3 further comprising a backing screen of a mesh coarser than that of said first and second screens for underlying and supporting said abutting screens.

5. The screening apparatus of claim 3 wherein said first screen with rectangular openings is formed of 80×40 mesh and said second screen with rectangular openings is formed of 50×50 mesh.

6. The screening apparatus of claim 3 wherein said first rectangular mesh screen is formed of 120×60 mesh and said second screen is formed of 80×80 mesh.

7. The screening apparatus of claim 2 wherein both said first and second screen with rectangular openings are formed of 80×40 mesh.

8. A method of effectively preventing suspended solids from becoming lodged in a vibrating screening apparatus during removal of said suspended solids from a liquid comprising the steps of:

a. forming a first upper mesh screen having openings with first and second different dimensions for receiving said suspended solids thereon, b. placing a second lower mesh screen in superimposed abutting relationship with said first screen, said second screen having openings with a third and fourth dimension perpendicular to the dimensions of said first screen openings and having said third dimension larger than the smaller of said dimensions of said first mesh screen openings and said fourth dimension smaller than the larger of said dimensions of said first mesh screen openings, c. passing said liquid through said screens, and d. vibrating said screens with a vibratory source coupled to said abutting screens such that said abutting screens effectively prevent said suspended solids from becoming lodged in said openings.

9. The method of claim 8 further comprising the step of:

a. forming said first screen openings of rectangular shape, and b. forming said second screen openings of rectangular shape.

10. The method of claim 8 further including the step of forming said second screen openings of square shape.

11. The method of claims 9 or 10 further including the step of underlying and supporting said first and second screens with a third backing screen of a mesh coarser than that of said first and second screens.

12. The method of claim 10 further including the steps of forming said first screen rectangular openings of 80×40 mesh and said second screen of square openings of 50×50 mesh.

13. The method of claim 10 further including the step of forming said first rectangular mesh screen of 120×60 mesh and second screen of 80×80 mesh.

14. The method of claim 9 further including the step of forming said first and second rectangular mesh screens of 80×80 mesh.

* * * * *